United States Patent
Van Weelden

(10) Patent No.: US 9,582,008 B2
(45) Date of Patent: Feb. 28, 2017

(54) SYSTEMS AND METHODS FOR FLUID PUMP OUTLET PRESSURE REGULATION

(71) Applicant: HUSCO Automotive Holdings LLC, Waukesha, WI (US)

(72) Inventor: Curt Van Weelden, Waukesha, WI (US)

(73) Assignee: HUSCO Automotive Holdings LLC, Waukesha, WI (US)

( * ) Notice: Subject to any disclaimer, the term of this patent is extended or adjusted under 35 U.S.C. 154(b) by 631 days.

(21) Appl. No.: 13/803,152

(22) Filed: Mar. 14, 2013

(65) Prior Publication Data

US 2014/0261716 A1  Sep. 18, 2014

(51) Int. Cl.
G05D 16/20 (2006.01)
F16K 11/04 (2006.01)
F04B 49/06 (2006.01)
F04B 49/22 (2006.01)
F04C 14/22 (2006.01)
(Continued)

(52) U.S. Cl.
CPC ............ *G05D 16/20* (2013.01); *F01M 1/16* (2013.01); *F04B 49/002* (2013.01); *F04B 49/06* (2013.01); *F04B 49/22* (2013.01); *F04C 14/18* (2013.01); *F04C 14/22* (2013.01); *F16K 11/04* (2013.01); *F16K 17/00* (2013.01); *F16K 51/00* (2013.01); *G05D 16/2013* (2013.01);
(Continued)

(58) Field of Classification Search
CPC .... G05D 16/20; G05D 16/2013; F16K 17/00; F16K 51/00; F16K 11/04; F16K 31/0613; F01M 1/16; F01M 2001/0246; F01M 2001/0238; Y10T 137/0379; Y10T 137/86879; F04C 14/223; F04C 2/3442; F04C 14/18; F04C 14/22; F04C 14/24; F04C 28/28; F04B 53/1002; F04B 39/1006; F04B 49/002; F04B 49/06; F04B 49/2205
USPC ........... 417/26, 212, 220; 92/13; 137/625.69
See application file for complete search history.

(56) References Cited

U.S. PATENT DOCUMENTS 3,664,462 A  5/1972  Smith, Sr.
4,762,097 A  8/1988  Baker
(Continued)

FOREIGN PATENT DOCUMENTS

CN   102705034 A    10/2012
DE   102011055281 B3  2/2013
(Continued)

OTHER PUBLICATIONS

European Search Report; Appln No. EP 14 27 5035; Apr. 28, 2014; 7 pages.

*Primary Examiner* — Stephen Mick
(74) *Attorney, Agent, or Firm* — Quarles & Brady LLP

(57) ABSTRACT

Fluid pump pressure regulation systems and methods have a valve body with a bore and a valve spool. The valve spool connects a first and second port to a third port in different valve spool positions. The first port is in fluid communication with an output of a fluid pump to receive a first fluid pressure from the fluid pump. The second port is in fluid communication with a fluid reservoir. The third port is in fluid communication with a fluid pump input to provide a second fluid pressure to the fluid pump to control the first fluid pressure from the fluid pump. A linear actuator is adjacent the valve body, with a first spring and a second spring biasing the valve spool in a first or second direction.

22 Claims, 14 Drawing Sheets

(51) Int. Cl.
*F04B 49/00* (2006.01)
*F04C 14/18* (2006.01)
*F01M 1/16* (2006.01)
*F16K 51/00* (2006.01)
*F16K 17/00* (2006.01)
*F01M 1/02* (2006.01)

(52) U.S. Cl.
CPC .............. *F01M 2001/0238* (2013.01); *F01M 2001/0246* (2013.01); *Y10T 137/0379* (2015.04); *Y10T 137/86879* (2015.04)

(56) References Cited

U.S. PATENT DOCUMENTS

| | | | |
|---|---|---|---|
| 4,810,171 A * | 3/1989 | Krebs | F16H 61/433 417/218 |
| 5,119,691 A | 6/1992 | Lichti et al. | |
| 5,287,833 A * | 2/1994 | Yashiro | F01M 3/02 123/196 CP |
| 5,800,130 A * | 9/1998 | Blass | F04B 49/002 417/213 |
| 6,237,635 B1 * | 5/2001 | Nambu | F16K 31/124 137/487.5 |
| 6,640,834 B1 | 11/2003 | Hamkins et al. | |
| 6,899,068 B2 | 5/2005 | Nan et al. | |
| 7,000,580 B1 | 2/2006 | Smith et al. | |
| 7,007,925 B2 | 3/2006 | Nordstrom et al. | |
| 7,444,254 B2 | 10/2008 | Tsukada et al. | |
| 7,444,971 B2 | 11/2008 | Suga et al. | |
| 8,007,248 B2 | 8/2011 | Pryor et al. | |
| 8,056,576 B2 | 11/2011 | Van Weelden | |
| 8,186,327 B2 | 5/2012 | Ni | |
| 8,205,585 B2 | 6/2012 | Toda et al. | |
| 8,235,022 B2 | 8/2012 | Ni et al. | |
| 8,245,675 B2 | 8/2012 | Tomimatsu et al. | |
| 8,261,704 B2 | 9/2012 | Takemura | |
| 8,316,889 B2 | 11/2012 | Hoppe et al. | |
| 2002/0083915 A1 | 7/2002 | Choi | |
| 2007/0221149 A1 | 9/2007 | Ruiz | |
| 2007/0251474 A1 | 11/2007 | Gauthier et al. | |
| 2009/0057583 A1 * | 3/2009 | Van Weelden | F16K 31/0613 251/12 |
| 2009/0107451 A1 | 4/2009 | Bochart | |
| 2010/0084019 A1 | 4/2010 | Burke | |
| 2011/0005481 A1 | 1/2011 | Dinkel et al. | |
| 2012/0222634 A1 | 9/2012 | Dinkel et al. | |
| 2013/0239559 A1 * | 9/2013 | Ishikawa | B60K 6/12 60/414 |

FOREIGN PATENT DOCUMENTS

| | | |
|---|---|---|
| JP | 0579312 A | 3/1993 |
| JP | 2011122651 A | 6/2011 |

* cited by examiner

SYSTEMS AND METHODS FOR FLUID PUMP OUTLET PRESSURE REGULATION

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to fluid pump outlet pressure regulation; and in particular to fluid pump outlet pressure regulation as a function of engine speed.

2. Description of the Related Art

It is known in the art relating to fluid pumps, such as engine oil pumps, to vary the pump output (displacement) as a function of pump outlet pressure in order to maintain a desired pump outlet pressure as the speed of the engine driving the pump is varied. Regulating the fluid pump outlet pressure can increase engine efficiency by reducing the volume of oil pumped at higher engine speeds with a resultant saving of energy.

Pressure-lubrication has been used with automotive internal combustion engines for many years. Typically, a single pressure relief valve is used to limit the maximum pressure developed by an oil pump. The relief pressure is usually set at a fairly high value, in order to assure that the engine receives adequate lubrication in all operating conditions from idle to maximum speed-load operation. Unfortunately, this causes the lubrication pump's energy consumption to be higher than would otherwise be ideal, because in many operating regimes, only a reduced volume and pressure of oil is required by the engine.

Other engine lubrication systems use an electrically operated pressure control valve. A solenoid opens and closes a ball valve to control the pressure within a pilot chamber for a pressure valve It would be desirable to provide an engine lubrication system in which an engine is reliably protected with a pressure control valve, combined with the capability of maintaining an oil pressure within a predetermined pressure range so as to promote fuel economy improvement during all operating regimes.

SUMMARY OF THE INVENTIONS

In one embodiment, a fluid pump pressure regulation system a valve, the valve having a valve body with a bore and a valve spool slideably received within the bore. The valve body has a first port, a second port and a third port in fluid communication with the bore. The valve spool selectively connects the first port and the second port to the third port in different positions of the valve spool in the bore. The first port is in fluid communication with an outlet of a fluid pump to receive a first fluid pressure at the first port, the first fluid pressure having a first pressure level. The second port is in fluid communication with a fluid reservoir, the fluid reservoir to provide a source of fluid for the fluid pump. The third port is in fluid communication with a control port of the fluid pump to provide a second fluid pressure at the third port, the second fluid pressure having a second pressure level, the second pressure level to control the first pressure level from the fluid pump.

A linear actuator is adjacent the valve body and operatively coupled to the valve spool. A first spring biases the valve spool with respect to the valve body toward a second position when the first pressure level at the first port is less than a given threshold level. The valve spool is biased toward the first position when the first pressure level at the first port is greater than the given threshold level, and wherein activation of and deactivation of the linear actuator changes the given threshold level.

In another embodiment, a fluid pump pressure regulation system has a valve body with a bore and having a first port, a second port and a third port in communication with the bore. The first port is in fluid communication with a fluid pump outlet. The second port is in fluid communication with a fluid reservoir, the fluid reservoir to provide a source of fluid for the fluid pump. The third port is in fluid communication with a control port of the fluid pump wherein pressure applied to the control port controls flow of fluid from the fluid pump outlet. A valve spool is slideably received within the bore and has a first position in which the first port is connected to the third port and a second position in which the second port is connected to the third port.

An actuator is adjacent the valve body and operatively coupled to the valve spool. A first spring biases the valve spool into a second position when pressure at the first port is less than a given threshold level. The valve spool is in the first position when pressure at the first port is greater than the given threshold level, and wherein activation of and deactivation of the linear actuator changes the given threshold level.

In yet another embodiment, a method for fluid pump outlet pressure regulation includes the steps of providing a hydraulic valve, the hydraulic valve including a valve body with a bore and having a first port, a second port and a third port in communication with the bore. The first port is in fluid communication with a fluid pump outlet having a first pressure level. The first port is to receive the first pressure level from the fluid pump. The second port is in fluid communication with a fluid reservoir, the fluid reservoir to provide a source of fluid for the fluid pump. The third port is in fluid communication with a control port of the fluid pump having a second pressure level, the third port to provide the second pressure level to the fluid pump to control the first pressure level from the fluid pump. A valve spool is slideably received within the bore and has at least a first position and a second position. A first spring biases the valve spool toward the second position. A linear actuator is adjacent the valve body and operatively coupled to the valve spool. The steps include operating the linear actuator to apply a force on the valve spool to vary a pressure threshold at the first port that is required to move the valve spool and to regulate the fluid pump outlet pressure.

DETAILED DESCRIPTION OF THE INVENTION

Figure 1:
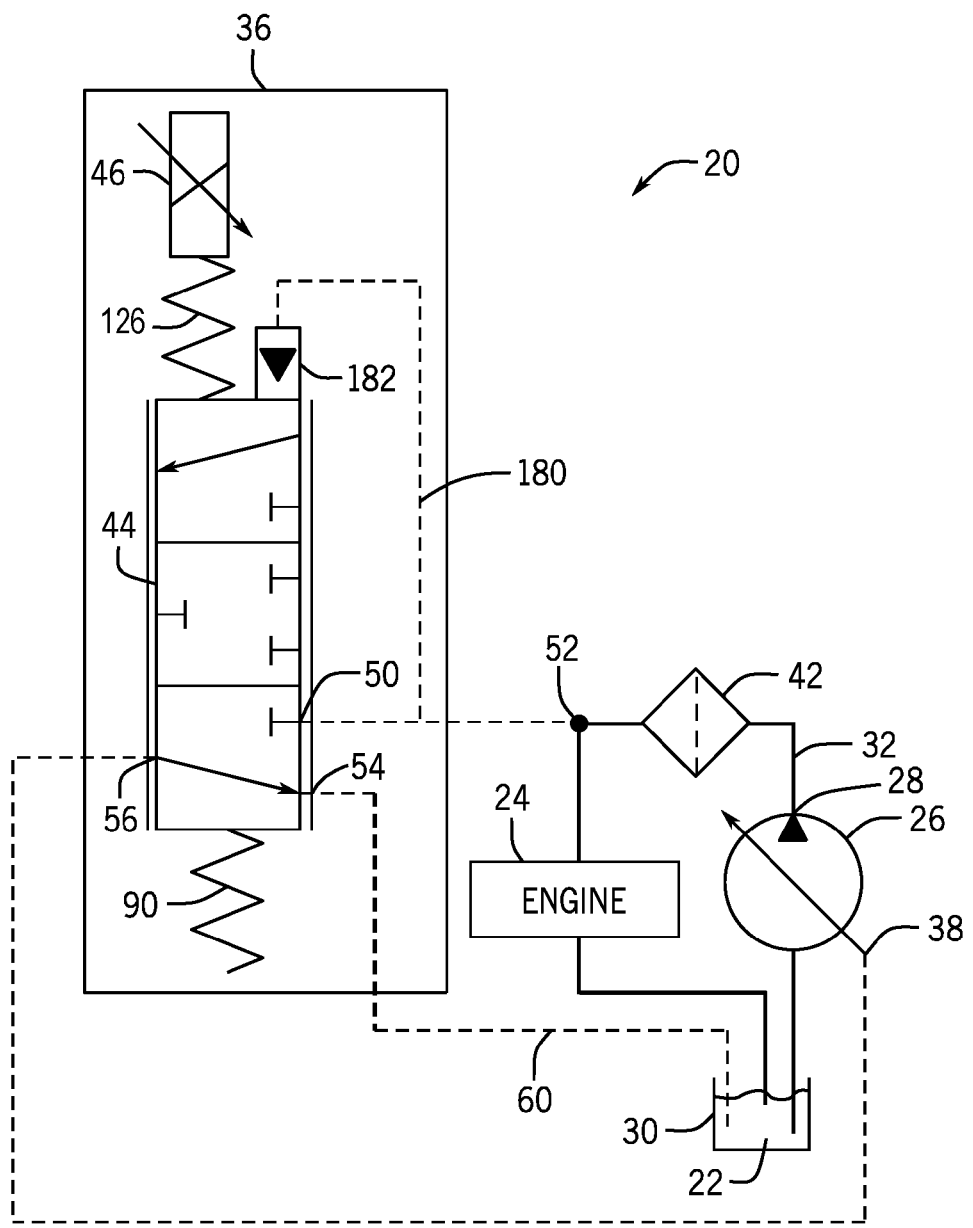
FIG. 1 is a schematic view of a system for controlling an oil pump that supplies lubricating oil to an internal combustion engine, according to embodiments of the present invention.

With reference to FIG. 1, a fluid pressure regulation system 20 for controlling the supply of lubricating oil 22 to an internal combustion engine 24 is shown. The engine 24 includes an oil pump 26 and an oil reservoir 30 containing a supply of lubricating oil 22. An oil distribution network 32 connects the engine 24 with the oil pump 26 and oil reservoir 30.

The fluid pressure regulation system 20 also includes a pressure control valve 36. The pressure control valve 36 is in fluid communication with the oil pump 26, the oil reservoir 30 and the oil distribution network 32. The pressure control valve 36 serves to control the oil pressure within the oil distribution network 32 and to the engine 24.

As is well known in the art, the oil pump 26 is typically mechanically driven by rotation of the engine's crankshaft (not shown), although other pump arrangements are also well known. The oil pump 26, however, differs from conventional pumps in that its displacement, i.e., the output volume, can be varied by a pressure level applied to a control port 38 on the oil pump 26. Varying that pressure varies the amount of flow that the oil pump 26 supplies from the oil reservoir 30 through an oil filter 42 to cavities at the upper parts of the engine 24. From those cavities, the oil 22 flows through the engine 24 by gravity until returning to the oil reservoir 30.

It should be understood that if the displacement of the oil pump 26 is held constant, the oil flow and the oil pressure at the output 52 of the oil filter 42 can be directly related to the speed of the engine 24. It is desirable, however, that the amount of oil 22 applied to the engine, and thus the pressure of that oil, be held within a predefined range regardless of engine speed.

Pressure control valve 36 is used to vary the displacement of the oil pump 26 to maintain the oil flow within the predefined range as the engine speed varies. In order to accomplish this, the pressure control valve 36 includes a hydraulic valve 44 attached to a linear actuator 46. Each will be described in greater detail below.

Figure 2:
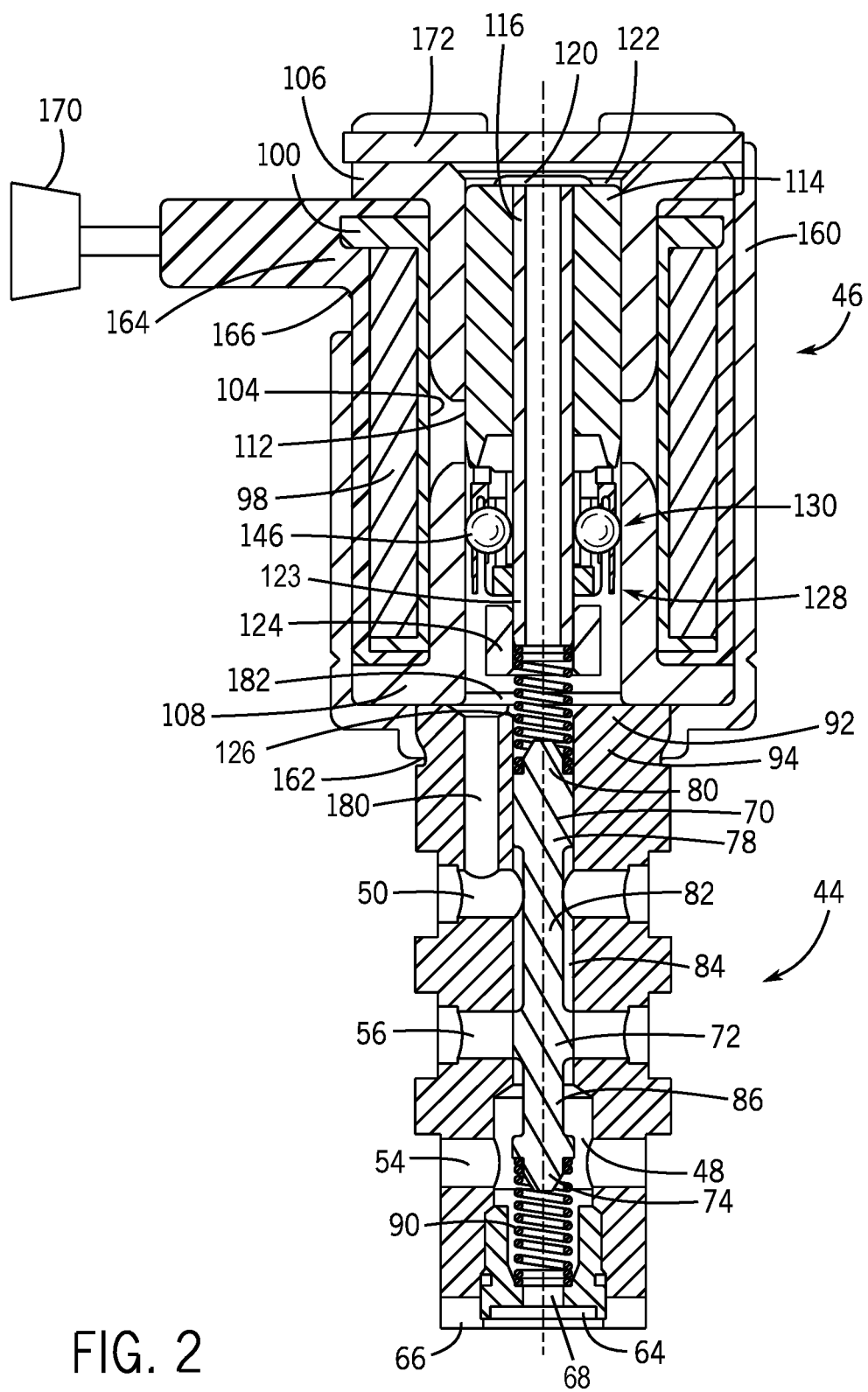
FIG. 2 is a longitudinal cross-sectional view through a pressure control valve usable in the system of FIG. 1, wherein a linear actuator is deactivated and a hydraulic valve is operating at a high pressure condition.

Referring to FIGS. 1 and 2, the hydraulic valve 44 has a valve bore 48 extending longitudinally there through with at least a first port 50, a second port 54, and a third port 56 opening into the valve bore 48. In the embodiment shown, the first port 50 receives the pressurized oil 22 from the oil filter output 52, and the second port 54 allows oil 22 to flow back to the oil reservoir 30. The third port 56 is connected to the control port 38 of the oil pump 26. The third port 56 is located along the valve bore 48 between the first port 50 and the second port 54. The first port 50 typically is connected to a source of pressurized fluid, such as the oil filter output 52, and the second port 54 is usually connected to a return line 60 leading to the oil reservoir 30. An opening 64 at the end 66 of the valve bore 48 can be included to provide an alternative outlet port.

By varying the position of a valve spool 70 within the valve bore 48, pressure from the oil pump 26 can be applied to the control port 38 in varying degrees and alternatively low pressure in the oil reservoir 30 can be applied to the control port 38 of the oil pump 26 by connecting the second port 54 and the third port 56. It is to be appreciated that the arrangement or placement of the ports can be altered or referred to by different names, yet still provide the same functionality.

The valve spool 70 is slideably received within the valve bore 48. In some embodiments, the valve spool 70 has a first land 72 near a first end 74 and a second land 78 near a second end 80, with a first recessed section 82 between the first land 72 and the second land 78, thereby forming a groove 84 around the valve spool 70. A reduced diameter, second recessed section 86 extends between the first land 72 and the first end 74 of the valve spool 70. A first spring 90 biases the valve spool 70 away from an adjustment screw 68 at the end 66 of the valve bore 48. Specifically the first spring 90 engages the valve spool 70 adjacent the first end 74. The first spring 90 forces the valve spool 70 toward the linear actuator 46. The second end 80 of the valve spool 70 is near an end 92 of the valve body 94 that is secured to the linear actuator 46.

The linear actuator 46 includes an electromagnetic coil 98 that is wound around a non-magnetic bobbin 100 which has a central opening 104. The linear actuator 46 also has two tubular pole pieces 106 and 108. The upper pole piece 106 extends into one end of the bobbin's central opening 104 and the lower pole piece 108, adjacent the valve body 94, extends into the other end of the central opening 104. The pole pieces 106 and 108 are spaced slightly apart from one another in the bobbin 100. An inverted, cup-shaped solenoid tube 112 extends into the two pole pieces 106 and 108 and has an open end facing the valve body 94 and a closed end within the upper pole piece 106. References herein to directional relationship and movement, such as upper and lower and up and down, refer to the relationship and movement of components in the orientation shown in the drawing, which may not be the orientation of those components when the valve is attached to a machine.

A ferromagnetic armature 114 is slideably received within the solenoid tube 112 and has a tubular push pin 116 secured within a central aperture through the armature 114. The push pin 116 can have a notch 120 at its upper end to allow fluid to enter when that end abuts the closed end 122 of the solenoid tube 112. The push pin 116 and the armature 114 move as a unit within the non-magnetic solenoid tube 112 in response to an electromagnetic field produced by electric current flowing through the coil 98. The electric current can be applied to the coil 98 from a computer operated engine control unit, for example.

The tubular configuration of the push pin 116 allows oil 22 to flow between opposite sides of the armature 114 during that movement. The push pin 116 projects from the armature 114 toward the valve body 94 and has a remote end 123 that engages and preferably is secured to a bushing 124. The bushing 124 can serve as a guide for a second spring 126 that extends between the bushing 124 and the second end 80 of the valve spool 70. Therefore, the second spring 126 tends to bias the valve spool 70 away from the linear actuator 46 and toward the end opening 64 of the valve bore 48. The armature 114, the push pin 116 and the bushing 124 form an armature assembly 128, however two or all three of those components could be fabricated from a single piece of material. Furthermore, that armature assembly 128 may have a different shape as long as it provides the same functionality, as will be described.

Figure 3:
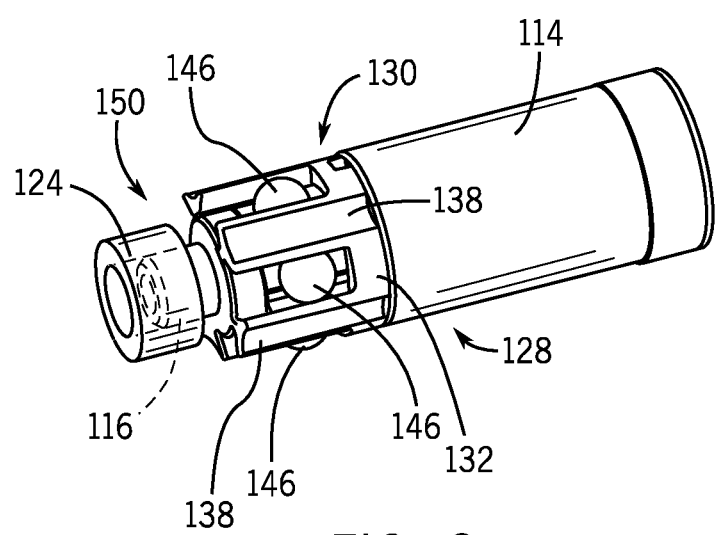
FIG. 3 is an isometric view of an armature assembly in the pressure control valve shown in FIG. 2.
Figure 4:
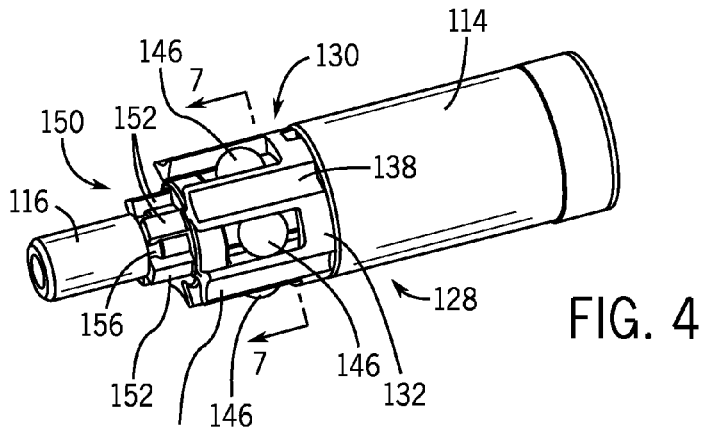
FIG. 4 is an isometric view of an alternative armature assembly in the pressure control valve.
Figure 5:
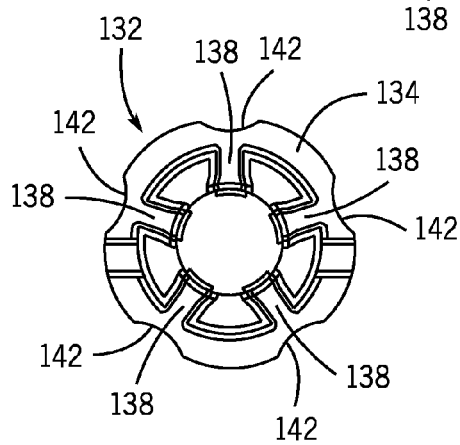
FIG. 5 shows one end of an alternative cage that can be part of a bearing on the armature assembly shown in FIG. 4.
Figure 6:
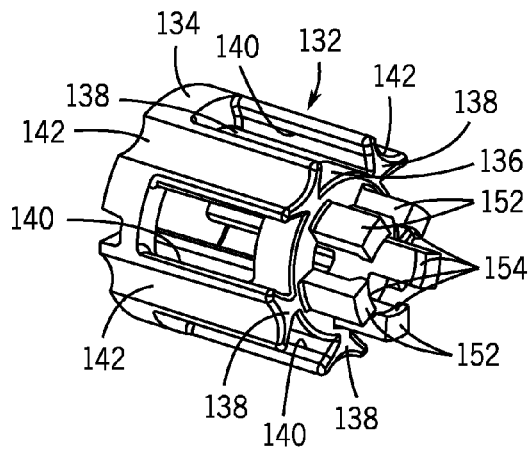
FIG. 6 is an isometric view of the cage shown in FIG. 4.
Figure 7:
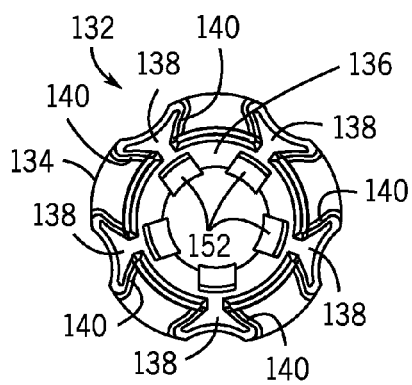
FIG. 7 is a plan view of another end of the cage shown in FIG. 4.
Figure 8:
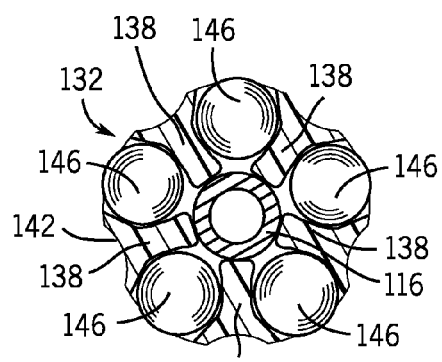
FIG. 8 is a cross sectional view taken along line 8-8 in FIG. 4.

Referring to FIGS. 2 and 3, a bearing 130 can be mounted on the push pin 116, and can be part of the armature assembly 128. An axial force is applied to the armature 114 by the magnetic flux at the end of the lower pole piece 108, and bearing 130 at this location prevents binding of the armature due to that axial force. In some embodiments, the bearing 130 can comprise a cage 132 fabricated of a non-magnetic material, preferably a resilient plastic. The cage 132 is a single piece with two spaced-apart end rings 134 and 136 between which five walls 138 extend, equidistantly spaced around the cage 132. Each wall 138 has a somewhat Y-shaped cross section, as seen in the cross section of FIG. 7, so as to be wider at the outer curved surface of the cage 132 than toward the center of the cage. Five longitudinal slots 140 are formed between adjacent ones of the five walls 138. The outer surfaces of the walls 138 are concave forming longitudinal channels 142 that extend the entire length of the walls 138. These channels 142 allow fluid to flow around the cage 132 which reduces resistance to the sliding motion of the armature 114 that would otherwise occur due to restricted fluid flow.

As show in FIGS. 2 and 3, a separate chromium plated sphere 146 provides a rollable element in each slot 140. The top of each generally Y-shaped wall 138 spreads into each slot 140 thereby narrowing the slot opening in the exterior curved surface of the cage 132 so that the spheres 146 are captured and cannot freely exit the slot 140. The plastic material of the cage 132 is resilient allowing adjacent walls 138 to be spread apart enough to allow insertion of a sphere 146 into the associated slots 140 and then return to their original positions to retain the sphere 146. The rings 134 and 136 at each end of the cage 132 prevent the spheres 146 from traveling out the ends of the slots 140. The term "captured" as used herein means that the spheres 146 are retained by the walls 138 and rings 134 and 136 of the cage 132 without requiring other components as in prior armature assembly designs. As seen in FIG. 2, each sphere 146 projects from the respective slot 140 into contact with the solenoid tube 112 and is able to roll within the respective slot 140. Other forms of rollable elements, such as cylinders, may be used in place of the spheres 146.

In an alternative embodiment seen in FIGS. 4-8, the cage 132 can include a latch 150 that comprises five L-shaped fingers 152 that project outwardly from the second ring 136 with finger tabs 154 that protrude into an annular groove 156 around the push pin 116. Engagement of the finger tabs 154 with the push pin's annular groove 156 retains the cage 132 against the armature 114. Alternatively, the cage 132 and the push pin 116 can be fabricated as a single plastic part.

The components of the linear actuator 46 described thus far can be enclosed in an exterior metal housing 160 that is crimped into a notch 162 around the valve body 94 to secure the linear actuator 46 to that valve body 94. In some embodiments, the electromagnetic coil 98 can include over-molded plastic and can then be installed in the housing 160. In an alternative embodiment, a plastic material can be injected into the housing 160 to form an over-molded enclosure 164 that extends around the electromagnetic coil 98 and projects through an opening 166 in the housing 160 to form an external electrical connector 170 for the electromagnetic coil 98. A metal end plate 172 closes the end of the housing 160 that is remote from the valve body 94.

In one exemplary use, the pressure control valve 36 is adapted to be installed in a fluid pressure regulation system 20 in which oil 22 from the oil pump 26, is applied to the first port 50 and in which a return line 60 to the oil reservoir 30 is connected to the second port 54. The third port 56 is connected to a device, i.e., the oil pump 26, that is being controlled by the pressure of the oil 22.

Figure 9:
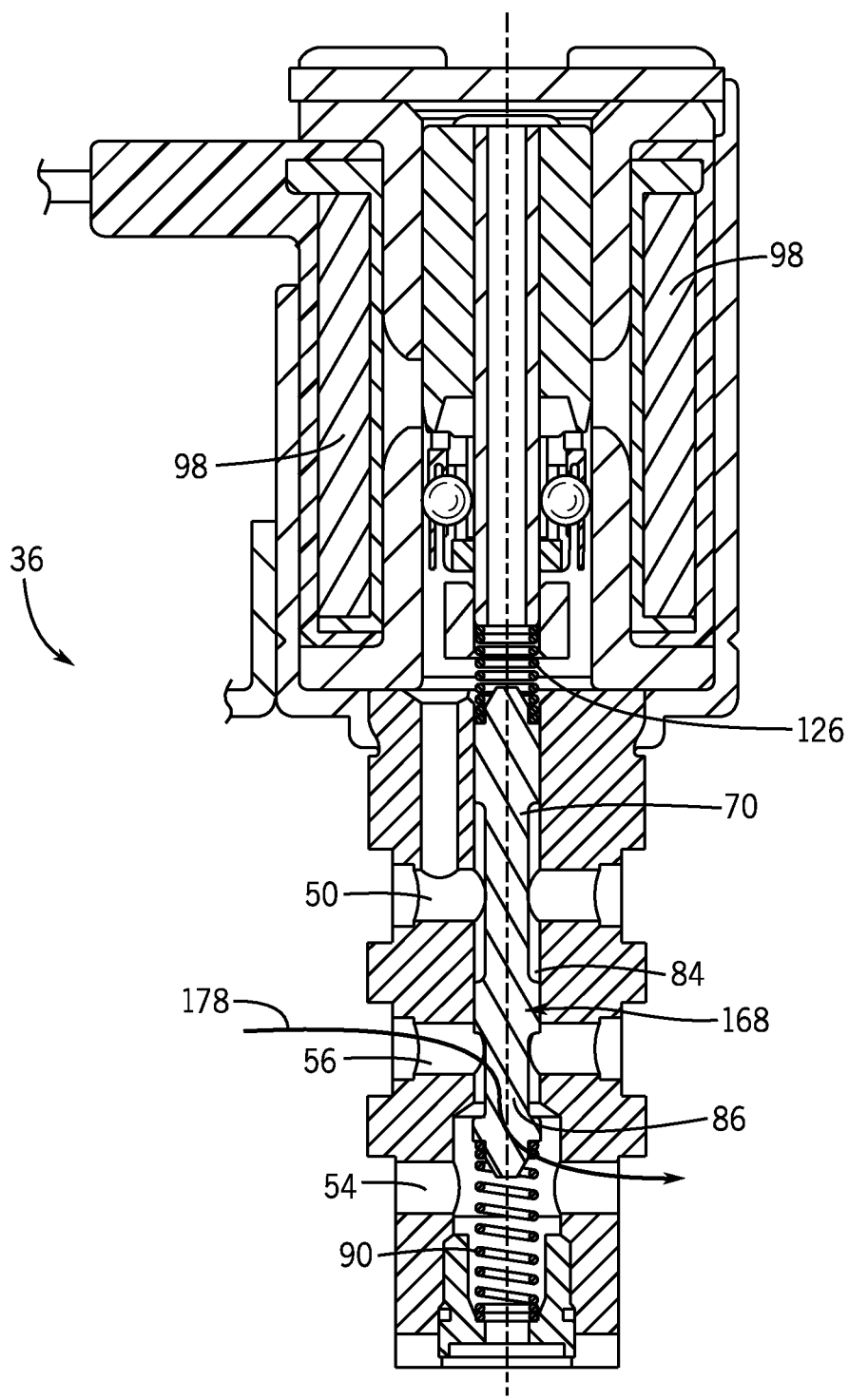
FIG. 9 is a longitudinal cross-sectional view through the pressure control valve of FIG. 2, and showing the pressure control valve in a condition with no current applied and no pressure applied to the first port.

FIG. 9 depicts the de-energized state of the pressure control valve 36 when there is zero current flowing through the electromagnetic coil 98 and when pressure at the first port 50 is zero or relatively low, such as occurs prior to starting the oil pump 26. At that time, the first spring 90 has more preload than the second spring 126 and the valve spool 70 is in a first position 168. In this configuration, the oil pump 26 would be at maximum displacement. In the first position 168, the valve spool 70 would be positioned such that the groove 84 around the valve spool 70 communicates with only the first port 50. However, the second recessed section 86 at the first end 74 of the valve spool adjacent to the first spring 90 provides a path 178 for oil 22 to flow from the third port 56 to the second port 54 and to the oil reservoir 30, thereby releasing any pressure at the third port 56.

Figure 10:
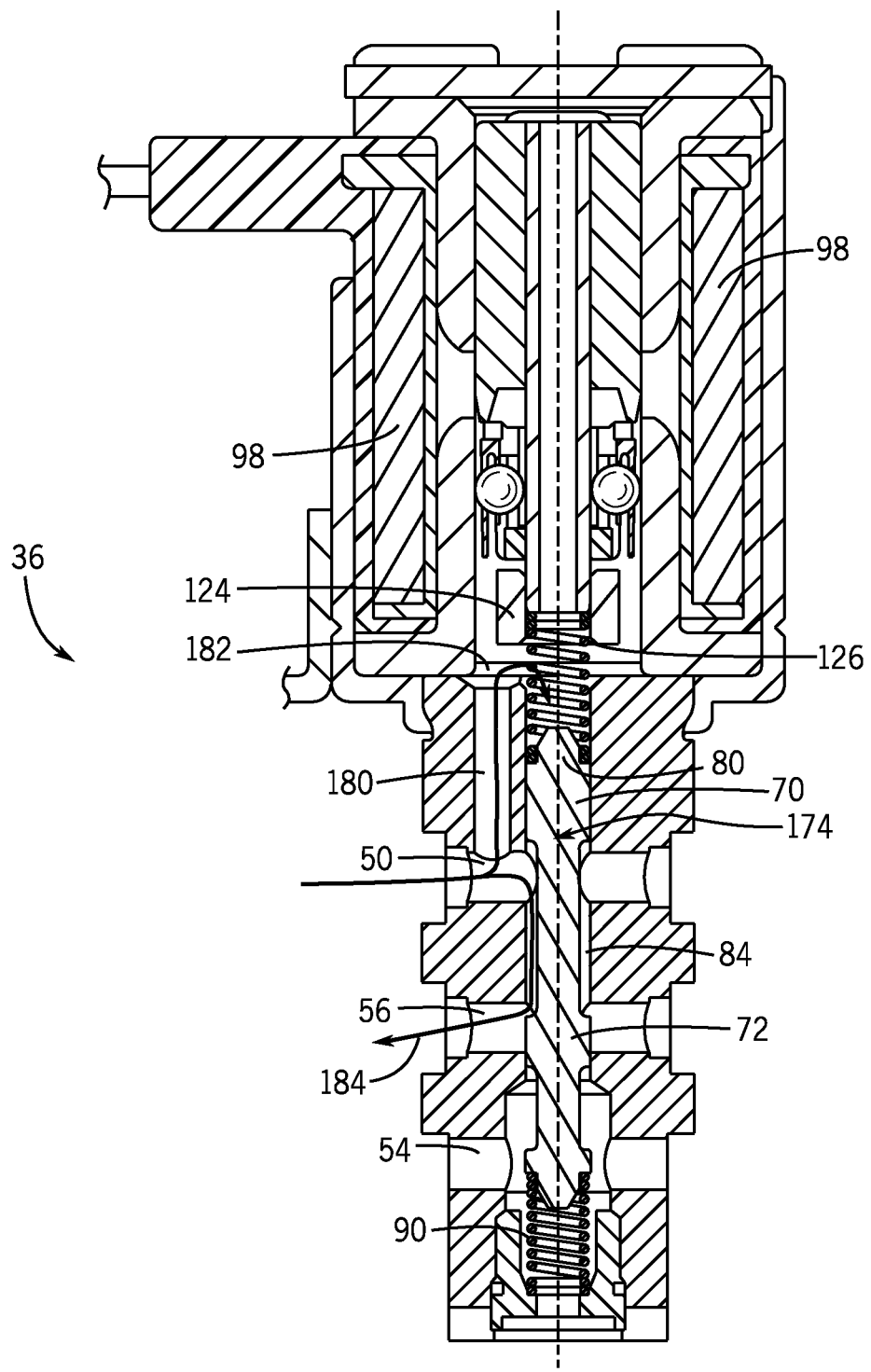
FIG. 10 is a longitudinal cross-sectional view through the pressure control valve of FIG. 2, and showing the pressure control valve in a condition with no current applied and a pressure applied to the first port.

Referring to FIG. 10, when the oil pump 26 is activated, the pressure at the first port 50 begins increasing. That pressure is communicated past the second end 80 of the valve spool 70 through a pilot passage 180, so that the same pressure exists in a pilot chamber 182 between the valve spool 70 and the bushing 124. When the pressure exceeds a first predetermined pressure threshold, the combined force from that pressure and the second spring 126 that is exerted on the second end 80 of the valve spool 70 is greater than the opposing force of the first spring 90, thereby resulting in downward movement of the valve spool 70 toward a second position 174, which compresses the first spring 90. When the pressure reaches the first predetermined pressure threshold, e.g., 4.5 bar, or more or less, the valve spool 70 moves into a position at which the first land 72 on the valve spool 70 closes communication between the third port 56 and the second port 54, and the annular groove 84 communicates with both the first port 50 and the third port 56, thereby providing a fluid path 184 there between. This fluid path 184 increases the pressure at the third port 56 which de-strokes the oil pump 26 and prevents the oil pump from exceeding the first predetermined pressure threshold.

Thereafter, when pressure at the inlet port 50 decreases significantly, the first spring 90 forces the valve spool 70 upward into the position illustrated in FIG. 9, at which the third port 56 can again communicate with the second port 54.

Figure 11:
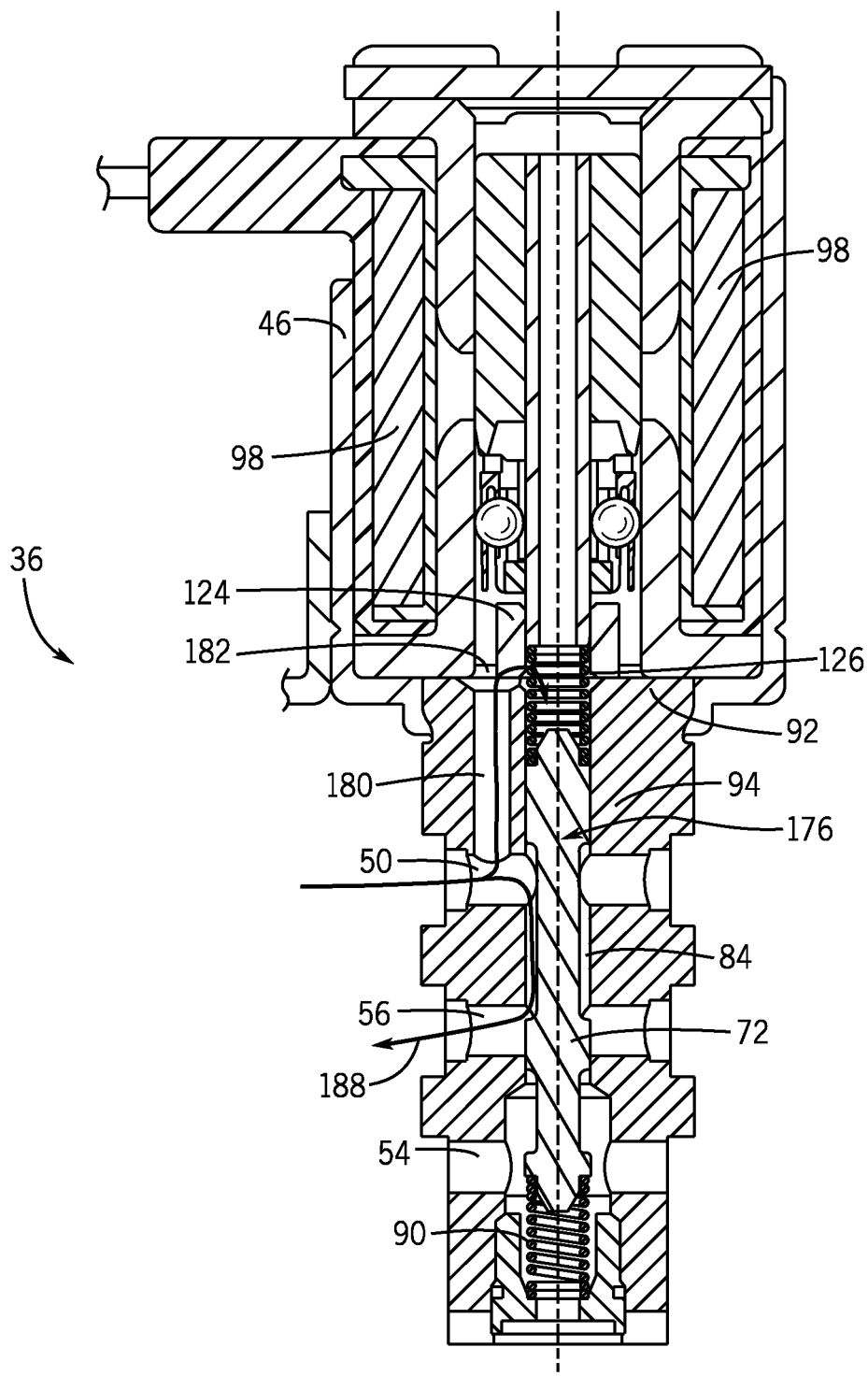
FIG. 11 is a longitudinal cross-sectional view through the pressure control valve of FIG. 2, and showing the pressure control valve in a condition with a current applied to the coil and a pressure applied to the first port.

Referring to FIG. 11, when the solenoid coil 98 is energized by an electric current, and with a predetermined pressure threshold, e.g., 4.5 bar, at the first port 50, the resultant electromagnetic field causes the armature 114 to move downward within the solenoid tube 112 from the position illustrated in FIG. 10 into the third position 176 in FIG. 11. Because the armature 114 is coupled by the push pin 116 to the bushing 124, the bushing 124 also moves downward until it strikes the upper end 92 of the valve body 94 which limits the amount of bushing motion regardless of the force produced by the electromagnetic field. This action initially compresses the second spring 126, thereby exerting a greater force on the valve spool 70 than the force from the opposing first spring 90. The resultant force imbalance causes the valve spool 70 to move downward compressing the first spring 90. Upon the bushing 124 resting against the upper end 92 of the valve body 94, the two springs 90 and 126 again reach a force equilibrium which positions the valve spool 70 in a more downward location than before the solenoid coil 98 was energized. In this third position 176, the first port 50 is connected to the third port 56 by the path 188 around the valve spool's annular groove 84.

The downward shift of the valve spool 70, produced by energizing the linear actuator 46, compresses both the first spring 90 and the second spring 126 a greater amount than when the linear actuator is de-energized. The compression of the first spring 90, in particular, alters the magnitude of the pressure required at the first port 50 to move the valve spool 70 into the third position 176 at which the path 188 is created between the first port 50 and the third port 56. This fluid path 188 again increases the pressure at the third port 56 which de-strokes the oil pump 26 and reduces the pressure from the oil pump 26 to something less than the first predetermined pressure threshold.

The magnitude of pressure that needs to be applied to the first port 50 for this action to occur (a second predetermined pressure) is less than the first predetermined pressure threshold for creating the path 184 (see FIG. 10) when the linear actuator 46 is de-energized. That second predetermined pressure can be determined by the stroke of the bushing 124 and the rate or force of the second spring 126, but is unaffected by the electromagnetic force which eliminates the need for accurate control of that force. Thus, by selectively energizing or de-energizing the linear actuator 46, the pressure at the first port 50 that is required to open communication between the first port 50 and the third port 56 can be set at two different predetermined pressures. Selecting the particular pressure alters the pressure response characteristic of the pressure control valve 36 and likewise operation of the oil pump 26 connected to the third port 56.

Figure 12:
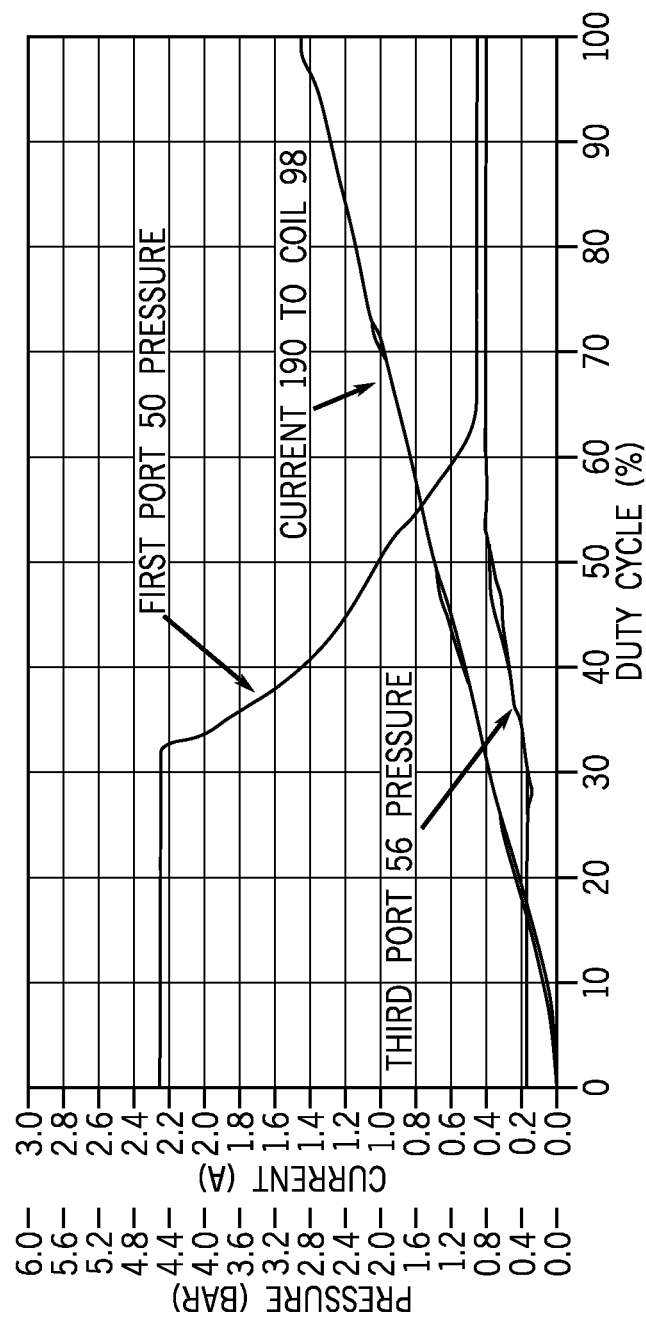
FIGS. 12 and 13 are graphs showing the effect of current applied to the coil on the pressure at the first port and the third port.
Figure 13:
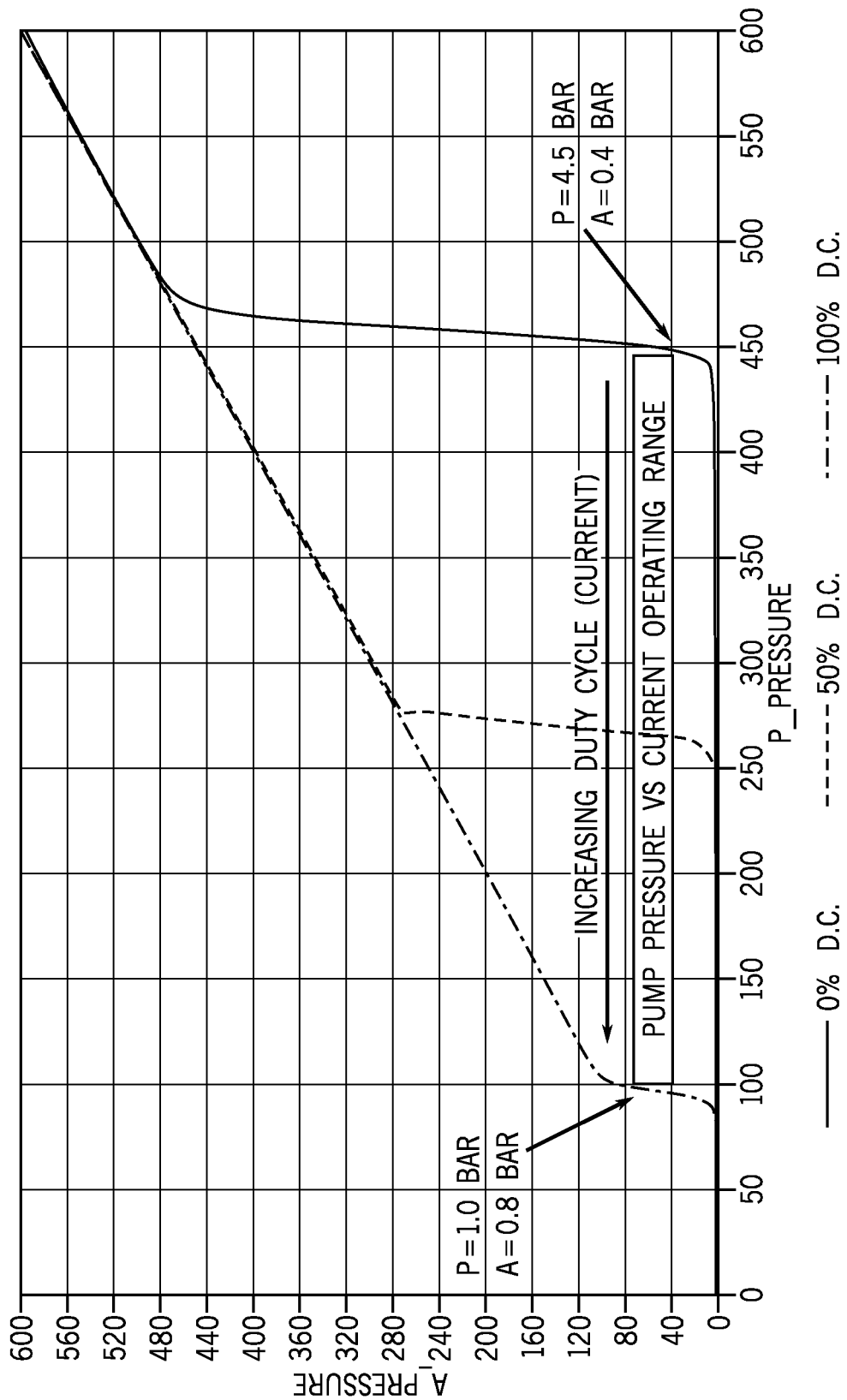

This response is shown graphically in FIGS. 12 and 13. With the first port 50 pressure at approximately 4.5 bar and the third port 56 pressure at approximately 0.4 bar, as current 190 to coil 98 increases to approximately 0.4 amps, the valve spool 70 begins to move, causing the pressure at the first port 50 to decrease and the pressure at the third port 56 to increase. As the current 190 continues to increase, at about 0.9 amps, the pressure at the first port 50 reduces and levels off to approximately 1.0 bar and the pressure at the third port 56 to increase to approximately 0.8 bar and level off. FIG. 13 shows a predetermined pressure range 192 of about 1.0 bar to about 4.5 bar. It is to be appreciated that the predetermined pressure range 192 can vary based on a particular application's requirements.

Figure 14:
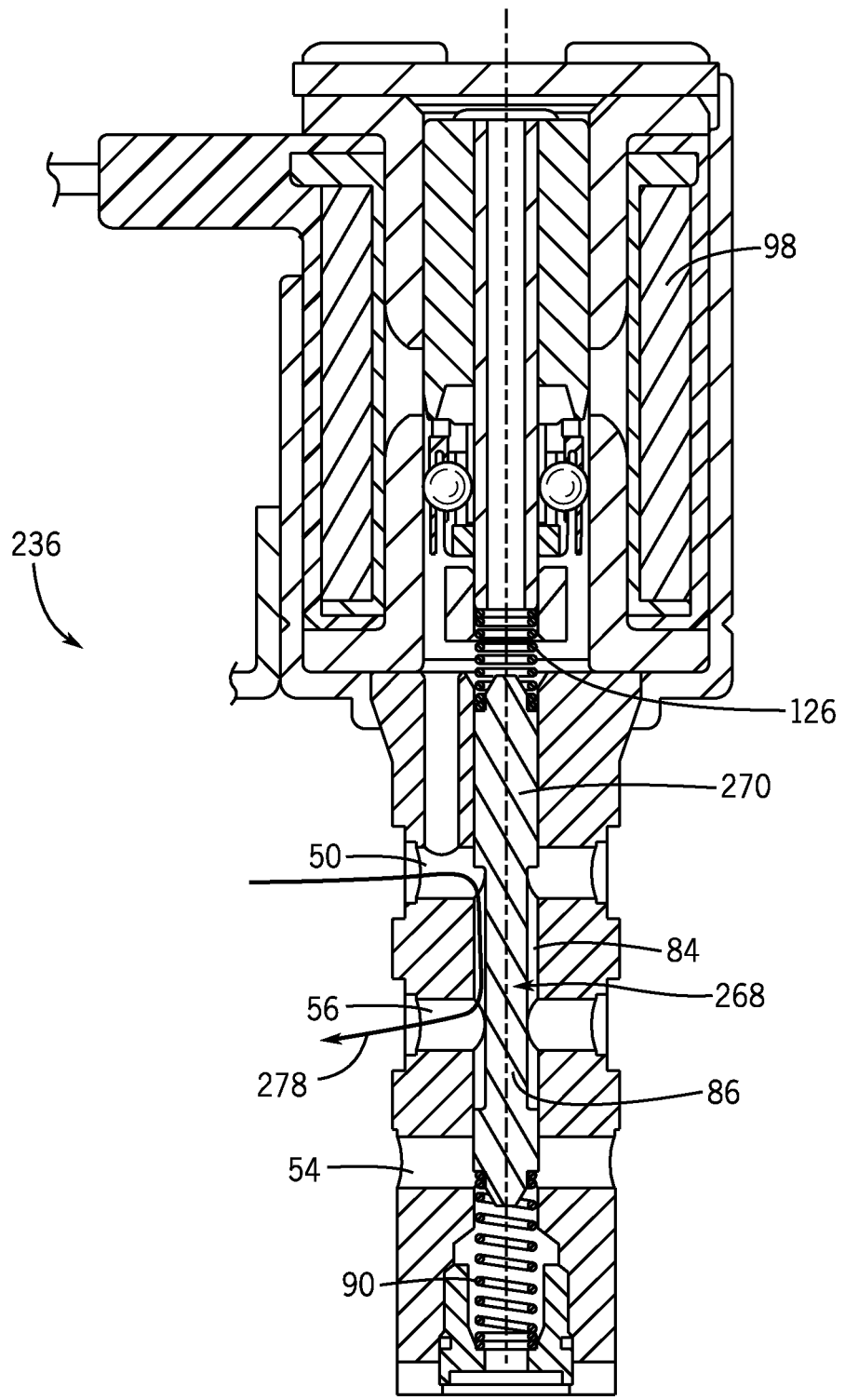
FIGS. 14-16 are longitudinal cross-sectional views through an alternative pressure control valve having reverse logic to the pressure control valve shown in FIG. 2.
Figure 15:
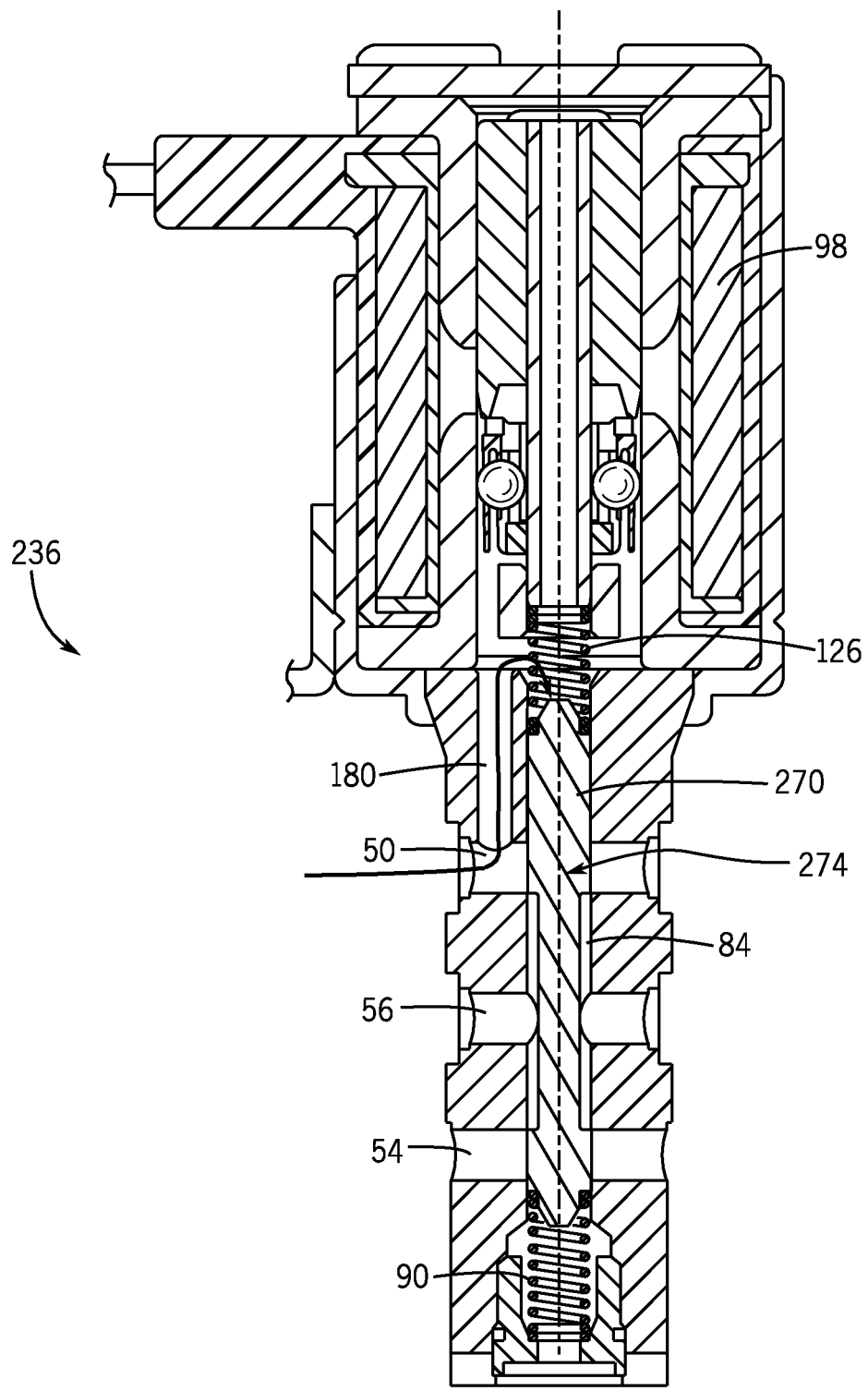
Figure 16:
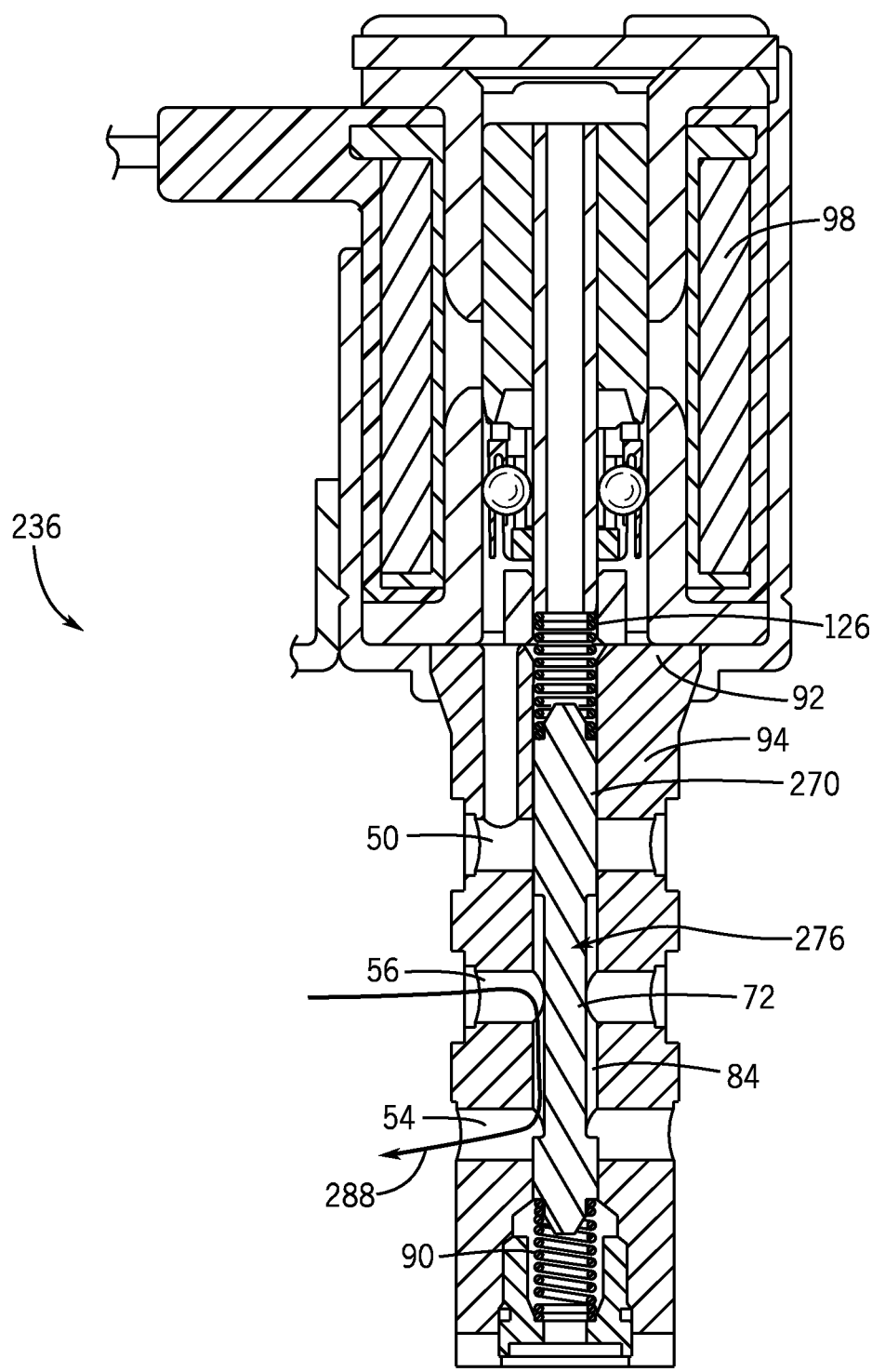

FIGS. 14-16 show an alternative configuration of a pressure control valve 236. Pressure control valve 236 is similar to pressure control valve 36, except pressure control valve 236 includes a spool 270 that is configured to provide a reverse logic to that of pressure control valve 36. For example, FIG. 14 depicts the de-energized state of the pressure control valve 236 when there is zero current flowing through the electromagnetic coil 98 and when pressure at the first port 50 is zero or relatively low. At that time, the first spring 90 has more preload than the second spring 126 and the valve spool 70 is in a first position 268. In this configuration, the oil pump 26 would be at maximum displacement. In the first position 268, the valve spool 270 would be positioned such that the groove 84 around the valve spool 270 communicates with the first port 50 and the third port 56 providing path 278 for oil 22 to flow out of the third port 56 and to the control port 38. Valve spool 270 will stay in this position until the pressure at the first port 50 reaches a predetermined pressure, e.g., 4.5 bar.

Referring to FIG. 15, as the pressure at the first port 50 rises, it overcomes the second spring 126 preload via pilot passage 180 and the spool 270 is pushed down. When the pressure at the first port 50 reaches the predetermined pressure, the spool 270 is force balanced and reaches a null position 274.

Referring to FIG. 16, thereafter, when the solenoid coil 98 is energized by an electric current, the resultant electromagnetic field causes the armature 114 to move downward within the solenoid tube 112 from the position illustrated in FIG. 15 into the position 276 in FIG. 16. Because the armature 114 is coupled by the push pin 116 to the bushing 124, the bushing 124 also moves downward until it strikes the upper end 92 of the valve body 94 which limits the amount of bushing motion regardless of the force produced by the electromagnetic field. This action initially compresses the second spring 126, thereby exerting a greater force on the valve spool 270 than the force from the opposing first spring 90. The resultant force imbalance causes the valve spool 270 to move downward compressing the first spring 90. Upon the bushing 124 resting against the upper end 92 of the valve body 94, the two springs 90 and 126 again reach a force equilibrium which positions the valve spool 270 in a more downward location than before the solenoid coil 98 was energized. In this third position 276, the second port 54 is connected to the third port 56 by the path 288 around the valve spool's annular groove 84.

Figure 17:
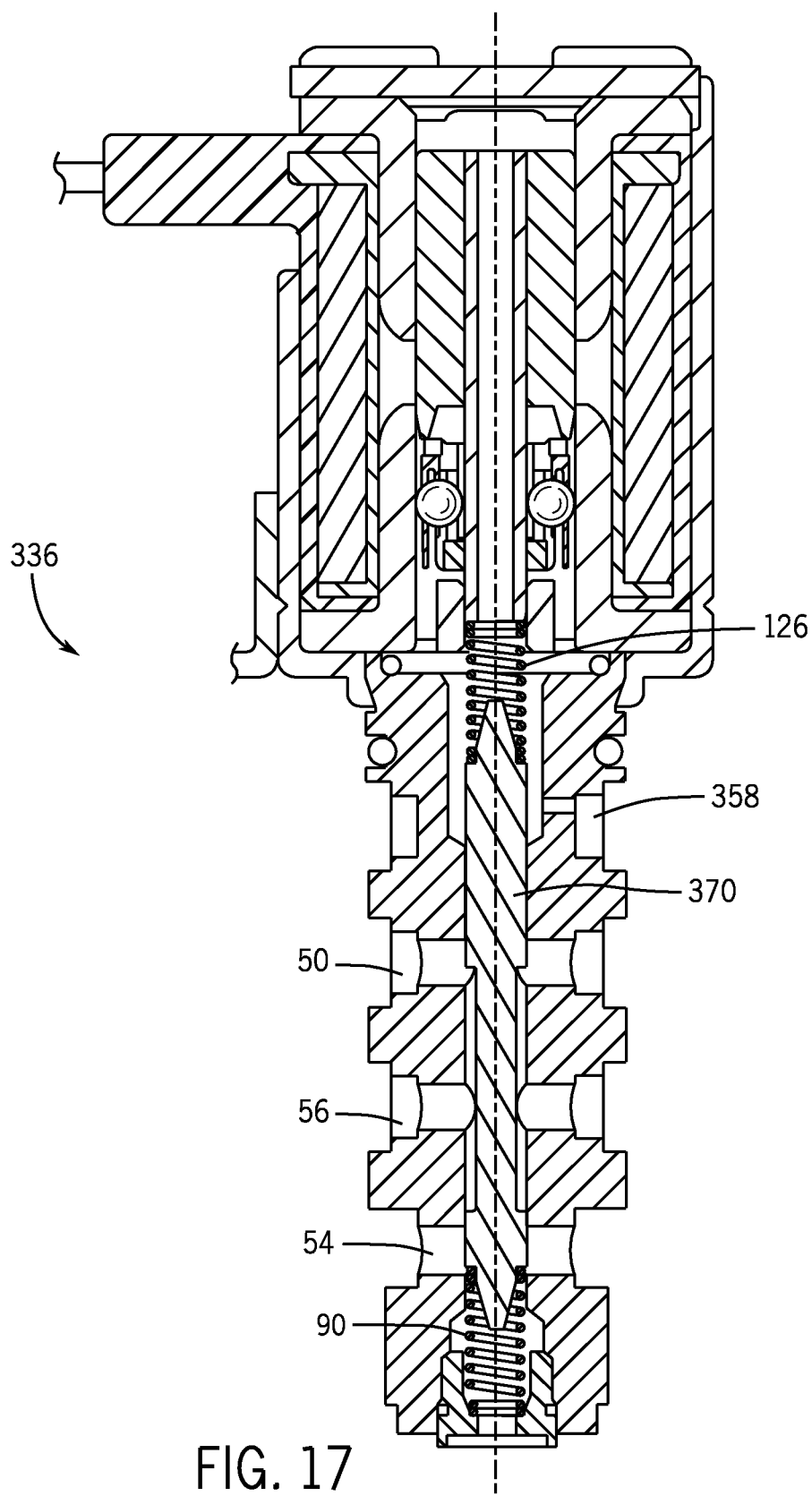
FIG. 17 is a longitudinal cross-sectional view through an alternative pressure control valve, and showing a four port valve.

Referring to FIG. 17, an alternative configuration of a pressure control valve 336 is shown. Pressure control valve 336 is similar to pressure control valves 36 and 236, except pressure control valve 336 includes a fourth port 358. With the three-port style pressure control valves 36 and 236, the third port 56 pressure can never exceed the first port 50 pressure, which is the oil filter outlet pressure 52. For the four-port pressure control valve 336, the pilot signal at the fourth port 358 is the oil filter outlet pressure 52, and the first port 50 receives the pump discharge pressure 28, which is higher than the oil filter outlet pressure 52 due to the pressure drop across the oil filter 42. In this case, the de-stroke pressure can be equal to the pump discharge pressure 28 and exceed the oil filter outlet pressure 52. This allows the oil pump 26 to use a stiffer spring (not shown), which can provide a more stable oil pump.

Figure 18:
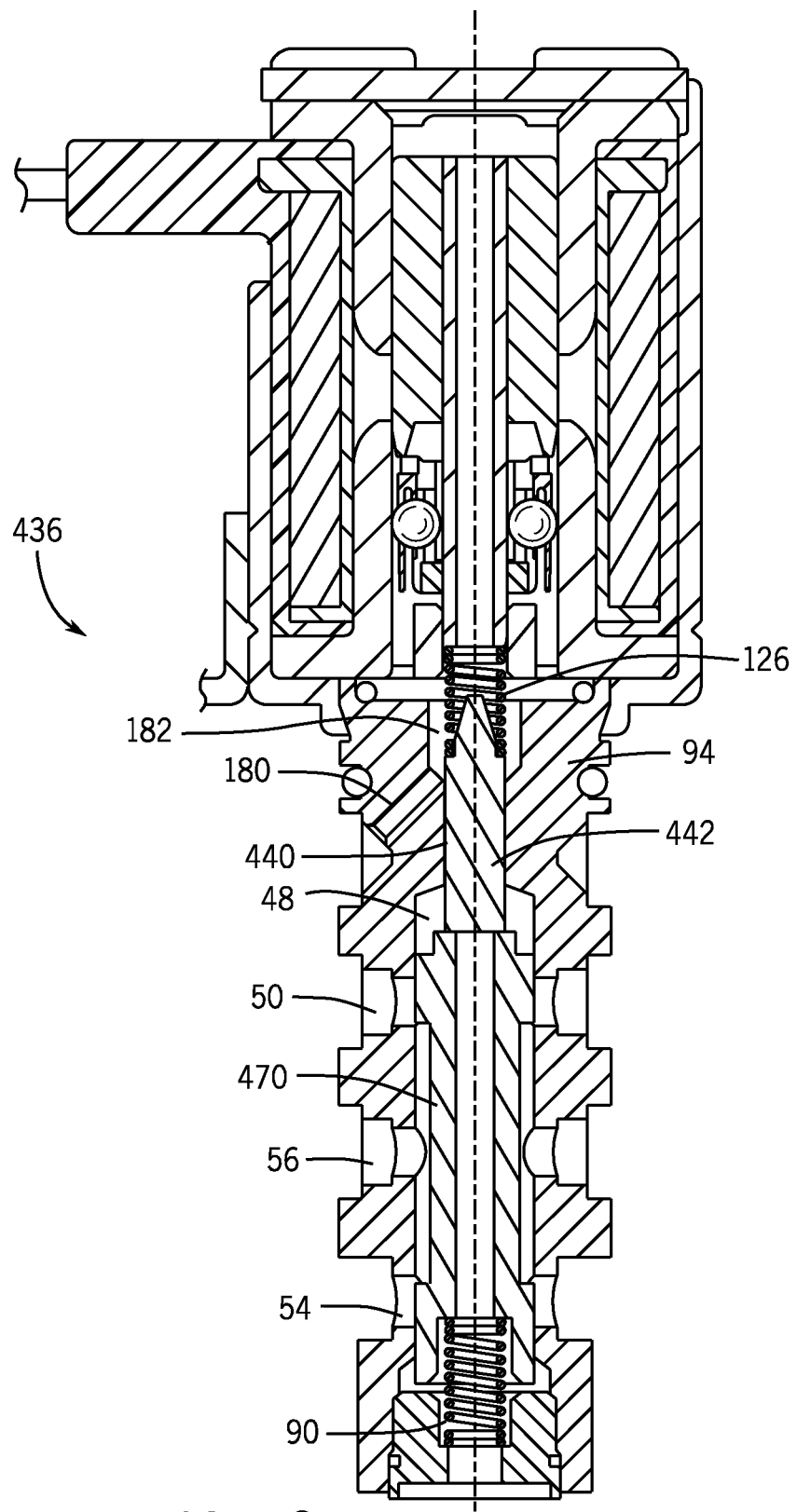
FIG. 18 is a longitudinal cross-sectional view through an additional alternative pressure control valve.

Referring to FIG. 18, an additional alternative configuration of a pressure control valve 436 is shown. Pressure control valve 436 is similar to pressure control valves 36, 236 and 336, except pressure control valve 436 includes a pin 440 positioned between the spring 126 and the spool 470. The pin 440 has a reduced diameter 442 and can extend from the pilot chamber 182 to the valve bore 48. The reduced diameter pin 440 allows the pressure control 436 to control to a greater pressure range without needing more linear actuator 46 force. The valve spool 470 and valve bore 48 can each have a larger diameter, which can increase the fluid flow area. It is to be appreciated that the pin 440 and spool 470 could be fabricated from a single piece of material or multiple pieces.

Referring again to FIG. 1, when the speed of the engine 24 increases and the oil filter outlet pressure 52 also increases, that increased pressure is applied to the pilot passage 180 and to the pilot chamber 182 at the top of the valve spool 70 via the first port 50 (see also FIG. 2). Even though the armature 114 remains in a fixed position because current 190 to the coil 98 is unchanged, the increased pressure in the pilot chamber 182 pushes the valve spool 70 downward opening the path 184 (see FIG. 10) between ports 50 and 56. The increased pressure is transmitted through path 184 to the control port 38 of the oil pump 26, thereby decreasing the displacement of the oil pump 26 and the outlet flow and pressure at the oil filter output 52, i.e., the higher the control pressure the lower the displacement.

The opposite action occurs when the speed of the engine 24 decreases causing the pressure in the pilot chamber 182 to also decrease. With a lower pressure in the pilot chamber 182, the first spring 90 pushes the valve spool 70 upward opening the path 178 (see FIG. 9) between the third port 56 and the second port 54. This path 178 reduces the pressure at the control port 38 of the oil pump 26, thereby increasing the displacement of the oil pump 26 and the outlet pressure at the oil filter output 52. In this manner, the outlet pressure and flow of oil 22 to the engine 24 remains within the predetermined pressure range 192 as the engine speed varies.

The pressure level to which the outlet pressure at the oil filter output 52 is controlled can be adjusted by the current level applied to the coil 98 in the linear actuator 46. Adjusting the current 190 varies the magnetic field produced by the coil 98 and thus the position of the armature 114 within the linear actuator 46. The variable position of the armature 114 can compress or relax the first spring 90 and the second spring 126, thereby applying different amounts of spring force to the first end 74 and second end 92, respectively, of the valve spool 70. Those forces define the pressure values that is required in the pilot passage 180 and pilot chamber 182 to move the valve spool 70. As a consequence, varying current 190 to the linear actuator 46 can affect the pressure level at which the valve spool 70 opens and closes the paths between the third port 56 and the first port 50 (path 184 and path 188), and the third port 56 and the return port 54 (path 178). Varying that pressure level alters the pressure within the predetermined pressure threshold range 192 to which the outlet pressure at the oil filter output 52 is controlled.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

The invention claimed is:

1. A fluid pump pressure regulation system comprising:
a valve, the valve having a valve body with a bore and a valve spool slideably received within the bore, the valve body having a first port, a second port and a third port in fluid communication with the bore, the bore including an adjustment screw, the valve body including a pilot passage arranged externally from the bore within the valve body to provide fluid communication between the first port and a second end of the valve spool, the valve spool selectively connects the first port and the second port to the third port in different positions of the valve spool in the bore;
the first port in fluid communication with an outlet of a fluid pump to receive a first fluid pressure at the first port, the first fluid pressure having a first pressure level;
the second port in fluid communication with a fluid reservoir, the fluid reservoir to provide a source of fluid for the fluid pump;
the third port in fluid communication with a control port of the fluid pump to provide a second fluid pressure at the third port, the second fluid pressure having a second pressure level, the second pressure level to control the first pressure level from the fluid pump to a value between a first predetermined pressure and a second predetermined pressure;
a linear actuator adjacent the valve body and operatively coupled to the valve spool;
a first spring coupled to the adjustment screw and in engagement with a first end of the valve spool opposite the second end to bias the valve spool with respect to the valve body toward a second position when the first pressure level at the first port is less than a given threshold level; and
a second spring biasing the valve spool toward a first position,
wherein the valve spool is biased toward the first position when the first pressure level at the first port is greater than the given threshold level, and wherein activation of and deactivation of the linear actuator changes the given threshold level to enable control of the first pressure level between the first predetermined pressure and the second predetermined pressure in proportion to a magnitude of a current applied to the linear actuator.

2. The system as recited in claim 1 further comprising a second spring extending between and coupling the linear actuator and the valve spool.

3. The system as recited in claim 1 wherein when the second pressure level increases, the first pressure level decreases.

4. The system as recited in claim 1 wherein when the second pressure level decreases, the first pressure level decreases.

5. The system as recited in claim 1 wherein the first pressure level is a first variable fluid pressure level and the second pressure level is a second variable fluid pressure level; and
wherein the second variable fluid pressure level at the control port of the fluid pump controls the fluid pump to maintain the first variable fluid pressure level within a predefined fluid pressure range.

6. The system as recited in claim 1 wherein the first pressure level from the fluid pump and the fluid reservoir are in fluid communication with an engine.

7. The system as recited in claim 1 wherein the fluid pump is a variable displacement fluid pump.

8. The system as recited in claim 1 wherein movement of the valve spool to the first position opens a path between the first port and the third port, and movement of the valve spool to the second position opens another path between the second port and the third port.

9. The system as recited in claim 1 wherein when the linear actuator is energized, the given threshold level is reduced.

10. The system as recited in claim 9 wherein the given threshold level is electrically controlled.

11. A fluid pump pressure regulation system comprising:
a valve body with a bore and having a first port, a second port and a third port in communication with the bore, the valve body including a pilot passage arranged within the valve body externally from the bore, the first port in fluid communication with a fluid pump outlet, the second port in fluid communication with a fluid reservoir, the fluid reservoir to provide a source of fluid for the fluid pump, the third port in fluid communication with a control port of the fluid pump wherein pressure applied to the control port controls flow of fluid from the fluid pump outlet, the bore including an adjustment screw;
a valve spool slideably received within the bore and having a first position in which the first port is connected to the third port and a second position in which the second port is connected to the third port, the pilot passage to provide fluid communication between the first port and a second end of the valve spool;
an actuator adjacent the valve body and operatively coupled to the valve spool, the actuator including an armature coupled to the valve spool and moveable between a first armature position and a second armature position in proportion to a current applied to a coil of the actuator;
a first spring coupled to the adjustment screw and in engagement with a first end of the valve spool opposite the second end to bias the valve spool into the second position when pressure at the first port is less than a given threshold level; and
a second spring biasing the valve spool toward the first position,
wherein the valve spool is in the first position when pressure at the first port is greater than the given threshold level, and wherein actuation of the armature between the first armature position and the second armature position changes the given threshold level in proportion to the current applied to the coil of the actuator.

12. The system as recited in claim 11 further comprising a second spring extending between and coupling the linear actuator and the valve spool.

13. The system as recited in claim 11 wherein the actuator comprises a solenoid coil assembly with a coil aperture formed therein, and an armature slideably received in the coil aperture, and operatively coupled to apply force to the valve spool.

14. The system as recited in claim 12 wherein the actuator varies a force applied by the second spring to the valve spool to vary the given threshold level at the first port that is required to move the valve spool.

15. The system as recited in claim 11 wherein fluid pressure from the fluid pump outlet and the fluid reservoir are in fluid communication with an engine; and
when a speed of the engine is varied, the given threshold level is varied between a first pressure level and a second pressure level to control the fluid pump to maintain the fluid pressure from the fluid pump outlet within a predefined fluid pressure range.

16. A method for fluid pump outlet pressure regulation, the method comprising;
providing a hydraulic valve, the hydraulic valve including:
a valve body with a bore and having a first port, a second port and a third port in communication with the bore, the valve body including a pilot passage arranged externally from the bore within the valve body, the first port in fluid communication with a fluid pump outlet having a first pressure level, the first port to receive the first pressure level from the fluid pump, the second port in fluid communication with a fluid reservoir, the fluid reservoir to provide a source of fluid for the fluid pump, the third port in fluid communication with a control port of the fluid pump having a second pressure level, the third port to provide the second pressure level to the fluid pump to control the first pressure level from the fluid pump to a value between a first predetermined pressure and a second predetermined pressure, the bore including an adjustment screw;
a valve spool slideably received within the bore and having at least a first position and a second position, the pilot passage to provide fluid communication between the first port;
a first spring coupled to the adjustment screw and in engagement with a first end of the valve spool opposite the second end to bias the valve spool toward the second position;
a second spring biasing the valve spool toward the first position;
a linear actuator adjacent the valve body and operatively coupled to the valve spool; and
operating the linear actuator to apply a force on the valve spool in proportion to a current applied to the linear actuation, wherein the force applied on the valve spool varies a pressure threshold at the first port that is required to move the valve spool in proportion to the current applied to the linear actuator thereby regulating the fluid pump outlet pressure between the first predetermined pressure and the second predetermined pressure.

17. The method as recited in claim 16 wherein the first position provides a path between the first port and the third port.

18. The method as recited in claim 16 wherein operating the linear actuator includes operating the linear actuator to apply the force on the valve spool to vary the pressure threshold to one of a plurality of pressure levels.

19. The method as recited in claim 16 wherein operating the linear actuator includes operating the linear actuator to apply the force on the valve spool to vary the pressure threshold between a first pressure threshold level and a second pressure threshold level.

20. The method as recited in claim 16 wherein the second pressure level is lower than the first pressure level.

21. The method as recited in claim 16 further including varying a speed of an engine in fluid communication with the fluid pump; and
maintaining the fluid pump output pressure within a predetermined pressure output range.

22. The method as recited in claim 21 further including controlling the predetermined pressure output range with electrical current.

* * * * *